(12) United States Patent
Dinev (10) Patent No.: US 9,357,145 B2
(45) Date of Patent: May 31, 2016

(54) AREA SCAN INTERLINE TRANSFER CCD IMAGING DEVICE AND APPARATUS WITH TDI SCANNING MODE

(71) Applicant: Imperx, Inc., Boca Raton, FL (US)

(72) Inventor: Petko Dimitrov Dinev, Boca Raton, FL (US)

(73) Assignee: Imperx, Inc., Boca Raton, FL (US)

( * ) Notice: Subject to any disclaimer, the term of this patent is extended or adjusted under 35 U.S.C. 154(b) by 0 days.

(21) Appl. No.: 14/329,291

(22) Filed: Jul. 11, 2014

(65) Prior Publication Data

US 2016/0014360 A1    Jan. 14, 2016

(51) Int. Cl.
*H04N 5/335*     (2011.01)
*H04N 5/372*     (2011.01)

(52) U.S. Cl.
CPC .................................... *H04N 5/372* (2013.01)

(58) Field of Classification Search
CPC .................................................. H04N 5/23245
USPC .................. 348/295–297, 311, 312, 317, 321
See application file for complete search history.

(56) References Cited

U.S. PATENT DOCUMENTS

| | | | |
|---|---|---|---|
| 4,870,293 | A | 9/1989 | Elabd |
| 4,922,337 | A | 5/1990 | Hunt et al. |
| 6,255,134 | B1 | 7/2001 | Hori |
| 7,212,240 | B1 | 5/2007 | Litwiller |
| 7,417,243 | B2 | 8/2008 | Katzir et al. |
| 7,675,561 | B2 | 3/2010 | Lepage |
| 7,897,902 | B2 | 3/2011 | Katzir et al. |
| 8,085,327 | B2 | 12/2011 | Schrey et al. |
| 8,451,354 | B2 | 5/2013 | Cazaux et al. |
| 8,536,506 | B2 | 9/2013 | Katzir et al. |
| 8,692,916 | B2 | 4/2014 | Lazovsky et al. |
| 8,736,924 | B2 | 5/2014 | Nelson et al. |
| 2004/0014332 | A1* | 1/2004 | Wen ................ H01L 21/823406 438/75 |
| 2007/0195182 | A1* | 8/2007 | Ito ................................. 348/308 |
| 2009/0256735 | A1* | 10/2009 | Bogaerts ....................... 341/169 |
| 2014/0104468 | A1 | 4/2014 | Parker et al. |

* cited by examiner

*Primary Examiner* — Joel Fosselman
(74) *Attorney, Agent, or Firm* — Jon Gibbons; Fleit Gibbons Gutman Bongini & Bianco PL (57) ABSTRACT

The present description describes a method and apparatus for using a single exposure area scan interline transfer CCD imaging devices in TDI scanning mode. The user is enabled to obtain a high resolution area-scan image with very high sensitivity from a conventional interline transfer CCD imager. The user may select the number of TDI stages, and in some cases of multi-tap CCD structures, obtain a two dimensional area-scan image. Utilizing a conventional interline CCD imager for TDI scanning allows a normal image to be produced by switching the mode back and forth between TDI and conventional area scan imaging.

19 Claims, 7 Drawing Sheets

AREA SCAN INTERLINE TRANSFER CCD IMAGING DEVICE AND APPARATUS WITH TDI SCANNING MODE

BACKGROUND

The present description generally relates to an image capturing process and device.

Almost every modern manufacturing process uses machine vision systems. These systems ensure fast, accurate and repeatable measurements, and thus guaranteeing a consistent product quality. A main component of machine vision systems is an image capturing camera apparatus comprising of a Charge Coupled Device (CCD) or a Complementary Metal Oxide Semiconductor (CMOS) image sensor. While there are many variations of image sensors, most of the cameras utilize interline transfer imaging sensors, which can be generally classed in three categories: area-scan, line-scan or Time-Delay Integration (TDI) devices. In web products that need to be scanned across a wide field of view at high-speed, line-scan sensors based cameras may be used. Line-scan sensors often consist of a single row of pixels (usually several thousand) that are exposed sequentially as the camera (or more often the object to be inspected) moves under the field of view of the camera. Since the integration time for such high-speed imaging needs to be short, high-brightness line-lights are used to illuminate the object as it passes under the field of view of the camera. In some very high-speed line-scan applications, however, even the brightest line-scan lights may not provide enough illumination and.

TDI images may be used to increase the responsivity of the imaging system. TDI imagers are a variant of single line line-scan devices that feature multiple rows (stages) of photo-sensors. As the image moves under the TDI array, each of the multiple rows shift charge to the adjacent row synchronously providing multiple exposures of the same scene, the final line-scan image when read from the imager will have a much higher sensitivity. TDI imagers have manufacturer preset integration stages and direction of integration. Furthermore, TDI imagers synchronize to a movement of an object being photographed.

SUMMARY

In one example of the description, a TDI imaging process has a variable integration mode. In another example of the description, a TDI imaging process is combined with a single exposure area scan imaging process to allow for multiple modes of image processing from a common imaging element such as a CCD.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various examples and to explain various principles and advantages all in accordance with the present description, in which.

DETAILED DESCRIPTION

As required, detailed examples are disclosed herein; however, it is to be understood that the materials disclosed are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure is presented for purposes of illustration and description, but is not intended to be exhaustive or limited in the form disclosed. Many modifications and variations will be apparent without departing from the scope of the description. The examples are chosen and described in order to best explain the principles of the description and the practical application, and to enable others to understand the description for various examples with various modifications as are suited to the particular use contemplated.

Increasing sensitivity of a TDI imager is useful in high-speed web applications and applications such as aerial reconnaissance and satellite mapping where low-light levels may be encountered. Also, a factory pre-determined number of TDI stages cannot be changed by the user, and often the number of stages is divisible by 2. The description provides for a variable number of stages for integration. Furthermore, a manufacturer preset direction of TDI scan imposes restrictions on a variety of applications, the description provides for changing the direction of the TDI scan.

While TDI techniques have in the past been limited to line-scan like imagers, this description includes a method and apparatus for using the readily available area scan interline transfer CCD imaging devices in TDI scanning mode. This allows the user to obtain a high resolution area-scan image with very high sensitivity from such an interline transfer CCD imager. A potential advantage of utilizing a such an interline CCD imagers for TDI scanning is that a normal image (photograph or image in a video) made from a single exposure area scan imaging process used in non-time delay integrating imaging systems can be produced by switching the mode back and forth between TDI and conventional area scan modes. In area scan mode, such systems do not require synchronization of the operation of the imaging element with the motion of an object being photographed.

In applications where the TDI mode is used, such as in a low altitude flying platforms such drones, planes, helicopters or low-orbit satellite reconnaissance systems, the inventor has provided a system that allows for the number of TDI stages to change constantly based on the local light conditions or other image quality considerations without producing a residual image from a previous frame.

Accordingly, the present description provides a novel method and apparatus for using the readily available area scan interline transfer CCD imaging devices in TDI scanning mode. This allows the user to obtain a high resolution area-scan image with very high sensitivity from any conventional interline transfer CCD imager. Using this method, the user can select the number of stages, and in some cases obtain a two dimensional area-scan image.

In applications, where a fast relative motion between the camera and the object is present, or in low altitude flying platforms (drones, planes, helicopters or low-orbit satellite reconnaissance systems), in order to avoid motion smear the integration time must be very short. In such applications control lighting is not always possible, so integrating adjacent rows of pixel charges is useful in increasing the sensitivity of the imager while retaining the ability to image full image frames. To avoid any motion artifacts, the speed of shifting is synchronized with the speed of the relative motion between the imager and the object.

According to one example, an image is exposed onto the monochrome CCD pixels; this generates electrical charges proportional to the image intensity. The charges from individual pixels are first transferred to the vertical shielded charge storage area and then shifted once into the adjacent rows. Then a new image is exposed and the new charges from individual pixels are transferred to the vertical shielded charge storage area and then shifted once into the adjacent rows. The exposure times for different frames can be identical or different. This process is repeated as many times (N) as required to achieve the required image quality. The resulting accumulation of charge from multiple rows provides a higher image sensitivity.

For example, if the exposure time of each individual row is 100 microseconds and 200 rows are integrated (N=200 shifts or cycles), then the effective exposure time is 20 ms. To avoid motion artifacts, the seed of shifting is synchronized with the speed of the relative motion between the imager and the object. Thus, after each shift the object projection onto the chip is the same spatial position. Then the entire area-scan image is read from the imager by subsequently shifting the vertical shield charge storage register by an amount equal the number of lines of pixels, or shifting all imager rows to the horizontal CCD register and then read out from the imager. In some applications, for better synchronization vertical over scan may be used where the number of subsequent shifting the vertical shield charge storage register may be by an amount greater than the number of lines of pixels, thus the shifting might be higher than the entire number of imager rows. When the entire image has been readout from the imager, the top N lines do not have identical exposure as the rest of the image, and may be removed in post processing.

The process can be applied to Bayer (RGBG or YCMG) color or SPARSE CFA imager. When a Bayer color imager is present, after the image has been exposed onto the CCD pixels, and then transferred to the vertical shielded charge storage area, two consecutive shifts are performed in order to preserve the Bayer pattern structure. This process is repeated as many times (M) as required to achieve the desired image quality. When the entire image has been readout from the imager, the top 2*M lines do not have identical exposure as the rest of the image, and if not needed can be removed in post processing.

When a SPARSE CFA imager is present, after the image has been exposed onto the CCD pixels, and then transferred to the vertical shielded charge storage area, four consecutive rapid shifts are performed, in order to preserve the SPARSE CFA pattern structure. This process is repeated as many times (K) as required to achieve the required image quality. When the entire image has been readout from the imager, the top 4*K lines do not have identical exposure as the rest of the image, and if not needed can be removed in post processing.

The process can be applied to an imager with a multi-tap structure where there is a top-bottom symmetry and horizontal CCD registers are present at the top and the bottom of the CCD chip. With such an imager a bidirectional TDI scan may be performed where the shift direction can be towards the top or the bottom of the imager depending on the direction of motion of the object being imaged. When such imager is present, after the image has been exposed onto the CCD pixels, and then transferred to the vertical shielded charge storage area, a vertical shift is performed once if the imager is monochrome (twice for Bayer and 4 times for SPARSE CFA) into the adjacent rows. In such multi-tap CCD structure the vertical shift is performed across the entire chip, thereby avoiding any gap in the center of the image.

Figure 1:
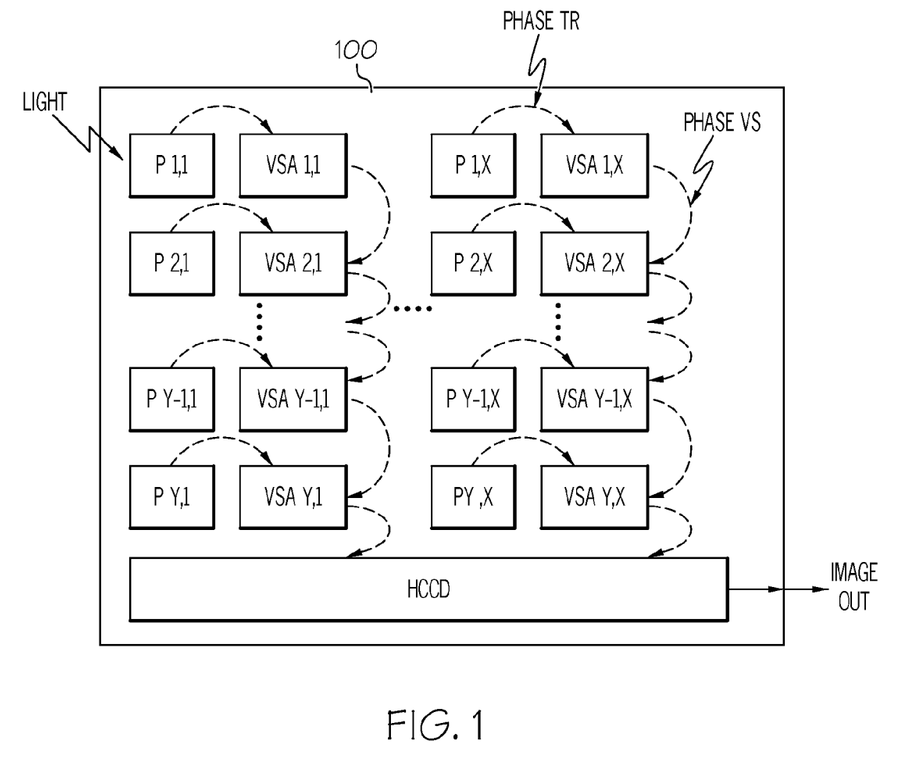
FIG. 1 illustrates an example process for using the ordinary monochrome area scan interline transfer CCD imaging devices in TDI scanning mode.

FIG. 1 illustrates an example process for using the ordinary monochrome area scan interline transfer CCD imaging devices in TDI scanning mode. With reference to FIG. 1, a light falling onto a interline transfer imager 100 has been exposed onto the monochrome CCD pixels P 1,1 to P X,Y, thus generating electrical charges proportional to the image intensity. The imager 100 has X pixels per line and Y lines of pixels per frame. The charges from individual pixels are first transferred to the associated local vertical shielded charge storage areas (VSA) during Phase TR. In Phase TR the charges form pixel P 1,1 are transferred into VSA 1,1 . . . and charges form pixel P Y,X are transferred into VSA Y,X. Then a vertical shift is perform once—Phase VS, so the charges from VSA Y,1 move to corresponding HCCD for image outputting, charges from VSA Y-1, 1 are shifted to VSA Y,1 . . . and the charges from VSA 1,1 are shifted to VSA 2,1. Then a new image is exposed and the Phase TR and Phase VS repeat. The exposure times for each of the frames may be identical or different depending upon for example object brightness and the number of frames to be integrated. This process is repeated as many times (N) as required to achieve the required image quality. Then the entire area-scan image is read from the imager by shifting all Y imager rows to the HCCD register and then read out from the imager. If the applications requires, the number of subsequently shifting might be higher than Y resulting in an over scan. When the entire image has been readout from the imager, the top N lines do not have identical exposure as the rest of the image, and may be removed in post processing.

Figure 2A:
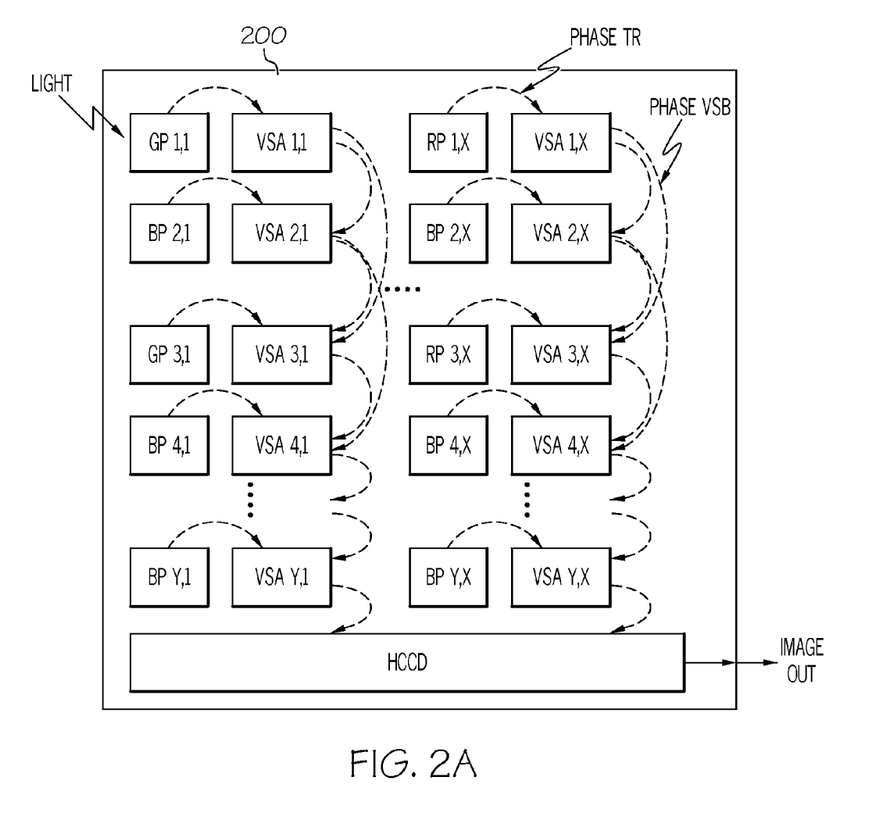
FIG. 2A-FIG. 2C illustrates an example of a process used with CCD elements having a Bayer color filter.
Figure 2B:
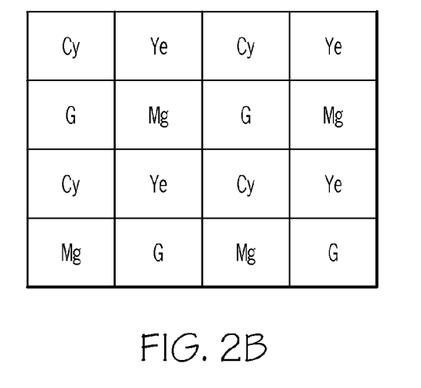
Figure 2C:
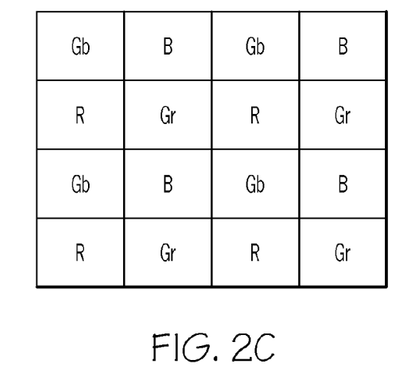

FIG. 2A-FIG. 2C illustrates an example of a process used with CCD elements having a Bayer color filter. The process of FIG. 2A is modified from and similar in structure to the process shown in FIG. 1. In FIG. 2A like parts, which correspond to those in FIG. 1, are marked with the same reference numbers. In this modified process, with reference to FIG. 2A, light falling onto a interline transfer imager 200 has been exposed onto the Bayer color pixels in a YCMG format as shown by FIG. 2B or a RGBG color pixel format as shown by FIG. 2C. The CCD pixels GP 1,1 to BP X,Y, generate electrical charges proportional to the image intensity. The imager 200 has X pixels per line and Y lines per frame arrange in Bayer color pattern.

The charges from individual pixels are first transferred to the associated local vertical shielded charge storage areas (VSA) during Phase TR. In Phase TR the charges form pixel GP 1,1 are transferred into VSA 1,1 . . . and charges form pixel BP Y,X are transferred into VSA Y,X. Then a vertical shift is performed in two stages—Phase VSB. In this Phase VSB, the charges from VSA 1,1 are shifted to VSA 3,1 in two stages, first the charges from VSA 1,1 are shifted to VSA 2,1 and then the charges from VSA 2,1 are shifted to VSA 3,1. This ensures that all pixels with identical colors are transferred to the same corresponding color. Similar, the charges from VSA 2.1 are shifted during Phase VSB to VSA 4.1 . . . and last, the charges from VSA Y,1 are shifted to HCCD. Then a new image is exposed and the Phase TR and Phase VSB repeat for another cycle. The exposure times for different frames or cycles may be identical or different. This process is repeated as many times (M) as required to achieve the required image quality. Then the entire area-scan image is read from the imager, by subsequently shifting all Y imager rows to the horizontal CCD register and then read out from the imager. If the applications requires, the number of subsequent shifts might be higher than Y. When the entire image has been readout from the imager, the top 2*M lines do not have identical exposure as the rest of the image, and may be removed in post processing.

Figure 2D:
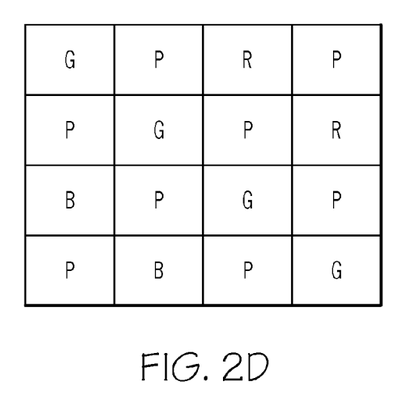
FIG. 2D illustrates an example of a process used with CCD elements having a SPARSE CFA color filter.

FIG. 2D illustrates an example of a process used with CCD elements having a SPARSE CFA color filter. This example is modified from and basically similar in structure to the example shown in FIG. 2A, with the interline transfer CCD having a SPARSE CFA pixel structure. The TDI method in this example is similar as described in FIG. 1. In this SPARSE CFA pixel structure the vertical transfer phase has to be performed into 4 stages—upon completing the Phase TR the charges from VSA 1,1 are transferred into VSA 5,1 into 4 consecutive stages—VSA 1,1->VSA 2,1->VSA 3,1->VSA 4,1->VSA 5.1. The entire process is repeated as many times (K) as required to achieve the required image quality. Then the entire area-scan image is read from the imager, by subsequently shifting all Y imager rows to the horizontal CCD register and then read out from the imager. The number of subsequently shifting might be higher than Y resulting in over scan. When the entire image has been readout from the imager, the top 4*K lines do not have identical exposure as the rest of the image, and may be removed in post processing.

Figure 3:
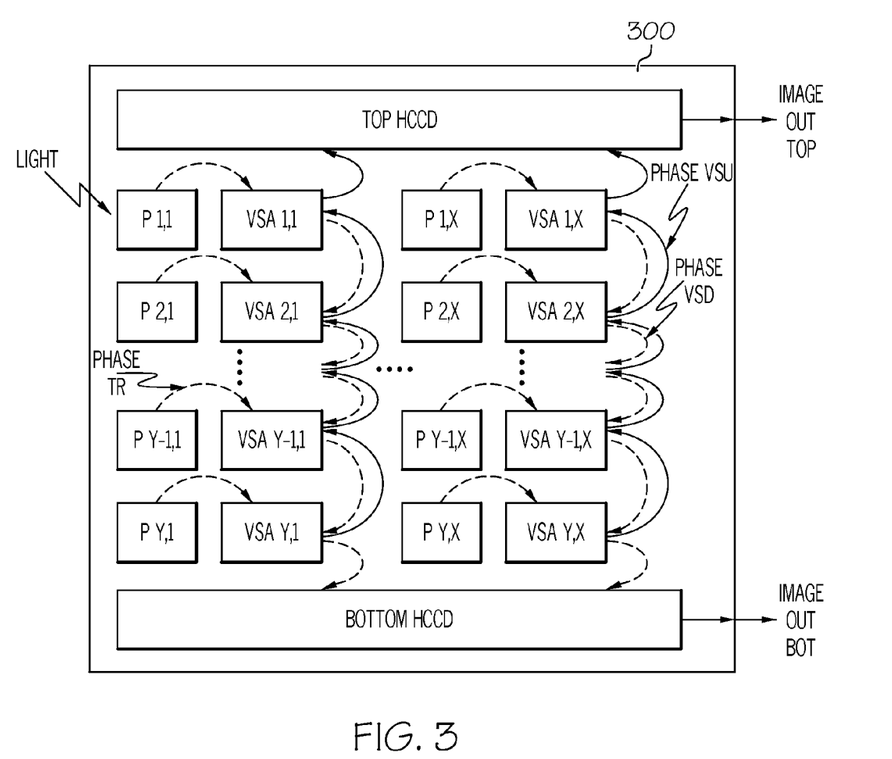
FIG. 3 illustrates an example which is substantially modified from the example shown in FIG. 1 which uses a multi-tap area scan imaging sensors which has HCCD registers located on top and bottom sides.

FIG. 3 illustrates an example which is substantially modified from the example shown in FIG. 1 which uses a multi-tap area scan imaging sensors which has HCCD registers located on top and bottom sides. In FIG. 3, like parts, which correspond to those in FIG. 1, are marked with the same reference numbers. In this example, with reference to FIG. 3 light falling onto a interline transfer imager 300 has been exposed onto the monochrome CCD pixels P 1,1 to P X,Y, generating electrical charges proportional to the image intensity. The imager 300 has X pixels per line and Y lines per frame and has at least two horizontal HCCD registers located on the opposite sides in vertical direction—at least one HCCD on the top, and at least one HCCD on the bottom. The charges from individual pixels are first transferred to the associated local vertical shielded charge storage areas (VSA) during Phase TR. In Phase TR the charges form pixel P 1,1 are transferred into VSA 1,1 . . . and charges form pixel P Y,X are transferred into VSA Y,X. Then depending on the direction of the scan direction a vertical shift is perform once—Phase VSD to transfer the charges towards the bottom HCCD, or Phase VSU to transfer the charges towards the top HCCD. If the Phase VSD is selected the charges from VSA Y,1 move to corresponding Bottom HCCD, charges from VSA Y-1, 1 are shifted to VSA Y,1 . . . and the charges from VSA 1,1 are shifted to VSA 2,1. Then a new image is exposed and the Phase TR and Phase VSD repeat. The exposure times for different frames can be identical or different. This process is repeated as many times (DN) as required to achieve the required image quality. Then the entire area-scan image is read from the imager, by subsequently shifting all Y imager rows to the bottom horizontal CCD register and then read out from the imager. In some multi tap configurations the image can be readout simultaneously from top and bottom HCCD registers. The number of subsequently shifting might be higher than Y. When the entire image has been readout from the imager, the top DN lines do not have identical exposure as the rest of the image, and may be removed in post processing. If the Phase VSU is selected the charges from VSA 1,1 move to corresponding Top HCCD, charges from VSA 2, 1 are shifted to VSA 1,1 . . . and the charges from VSA Y,1 are shifted to VSA Y-1,1. Then a new image is exposed and the Phase TR and Phase VSU repeat. The exposure times for different frames can be identical or different. This process is repeated as many times (UN) as required to achieve the required image quality. Then the entire area-scan image is read from the imager, by subsequently shifting all Y imager rows to the top horizontal CCD register and then read out from the imager. In some multi tap configurations the image can be readout simultaneously from top and bottom HCCD registers. If the applications requires, the number of subsequently shifting might be higher than Y. When the entire image has been readout from the imager, the top UN lines do not have identical exposure as the rest of the image, and may be removed in post processing. In such multi-tap CCD structure the vertical shift is performed only across the entire chip in any direction, shifting from the center to the top or bottom may produce a gap in center of the image.

In other examples, the process and device described herein may operate on any other standard or nonstandard color filter arrangement including Bayer Color and SPARSE CFA color filter arrangements.

Figure 4:
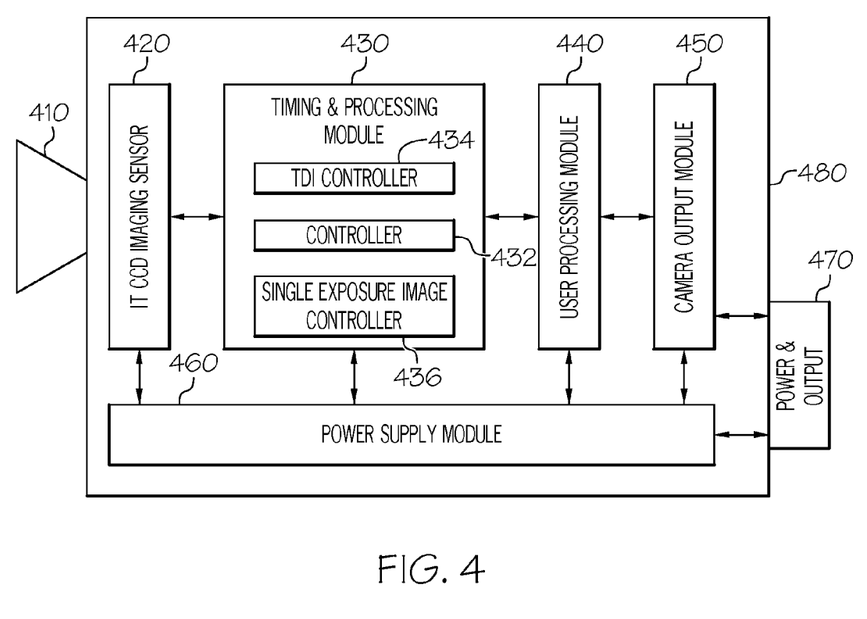
FIG. 4 illustrates a block diagram of a camera apparatus utilizing an ordinary area scan interline transfer CCD imaging device in standard area-scan and TDI scanning mode.

FIG. 4 illustrates a block diagram of a camera apparatus utilizing an ordinary area scan interline transfer CCD imaging devices in standard area-scan and TDI scanning mode. With reference to FIG. 4, an imaging lens 410 is connected to a camera housing 480, as it is optically coupled to an interline transfer CCD image sensor 420. The sensor 420 can be a combination of sensors. The sensor 420 is connected to a power supply module 460 and to a timing and processing module 430. The timing and processing module 430 includes a single exposure image controller 436 and TDI controller 434. Both controllers 434 and 436 may produce single image photographs and a series of images having a multiplicity of frames such as video streams using approaches known to those familiar with the art. Controller 432 selectively couples either the single exposure image controller 436 or the TDI controller 434 to the CCD 420. This allows the camera apparatus can work in a standard regular area scan single exposure non-integrating image mode producing photographs and/or video images or TDI scan multiple exposure integrating mode also producing photographs and/or video images. If a multi sensor approach is used, each CCD can run with a different timing—TDI or standard. The timing and processing module 430 may comprise one or several, identical or different processors, microcontrollers, ARM, DSP, CPU, or programmable hardware such as CPLD or FPGA. If executed in a computer, the description includes a computer program product for processing images, the computer program product comprising a non-transitory computer readable storage medium having program instructions embodied therewith, the program instructions being executable by a computer system.

The timing and processing module 430 is connected to the power supply module 460 and to a user processing module 440. The user processing module 440 may comprise of one or several, identical or different processors, microcontrollers, DSP, CPU, or programmable hardware CPLD or FPGA. The user processing module 440 may evaluate the image quality and further process the image. Image quality may include image brightness and sharpness and may signal the timing and processing module to modify its operation based upon image processing. The user processing module may further signal the timing and processing module to select either the TDI or single exposure area scan operating mode. For example if camera system 480 were installed in a low earth orbiting satellite, the camera may operate in the TDI mode when directed towards earth, which has a known rate of movement relative to the CCD, in order to receive high quality images of the earth as it passes below the satellite at a relatively high speed. However, should the camera 480 be pointed towards the stars for navigation purposes for example, the stars being relatively stationary, the user processing module may signal the timing and processing module to operate in the single exposure area scan mode. Furthermore, due to variable image brightness, the number of integration stages may be modified in the TDI mode while the exposure time may be modified in the single exposure area scan mode to obtain a desired image quality. Also, as the image changes from one frame to the next, the integration stages and/or exposure time may be modified from one frame to the next based upon image quality or brightness. The user processing module 440 may include a user processor. In one example the user processor and/or the user processing module may share at least some of the same hardware as timing and processing module 430. The user processing module 440 is connected to the power supply module 460 and to a camera output module 450. An output and power interface connector 470 is connected to the camera housing 480 and to the camera output module 450.

The light received from lens 410 is focused onto the surface of the sensor 420, where the photons from the light are converted to electrical charges and ultimately to a digital signal representing scene being imaged. The timing and processing module 430 generates all necessary signals to ensure proper operation of the CCD 420 in either the selected TDI or standard area scan modes. The timing and processing module 430 also receives signals from the CCD 420, processes the video signal and conditions it for further processing. The conditioned video signal from module 430 is transferred to the user processing module 440 for further data processing. The newly generated data stream from user processing module 440, is sent to the camera output module 450, where the data stream is converted to the appropriate output format, which typically can be Analog, Camera link, GigE, GigE Vision, USB 2.0, USB 3.0, USB 3.0 Vision, FireWire (IEEE 1394), CoaxPress, Wireless Wi-Fi, Bluetooth or any standard or nonstandard output format and is sent to power and output connector 470. The power supply module 460 provides the corresponding voltages to all modules. The power and output module 470 provides the main camera power to the camera system 480.

Accordingly, FIG. 4 shows an image capturing device 480 comprising a charge coupled device (CCD) 420 for capturing images, a time delay integration (TDI) image controller 434 selectively coupled to the CCD for producing a TDI data stream including TDI images from the CCD, a single exposure area scan image controller 436 selectively coupled to the CCD for producing a single exposure area scan data stream including single exposure area scan images from the CCD, and a controller 432 for selectively coupling the TDI image controller and the single exposure area scan image controller to the CCD. The image capturing device comprises a camera output module 450 coupled to the CCD 420 for producing a common image output format based upon the TDI data stream and the single exposure area scan data stream. The image capturing device provides a common image output format including one of Analog, Camera link, GigE, GigE Vision, USB 2.0, USB 3.0, USB 3.0 Vision, FireWire (IEEE 1394), CoaxPress, Wireless Wi-Fi, and Bluetooth using camera output module 450. The image capturing device further comprises a timing and processing module 430 including the TDI image controller 434 and the single exposure area scan image controller 436. The timing and processing module 430 is coupled to the CCD 420 and produces the TDI data stream and the single exposure area scan data stream. A user data processing module 440 is coupled to the timing and processing module 430. The user data processing module has a user process configured to process upon the TDI data stream and the single exposure area scan data stream and generate a user data stream. A camera output module 450 is coupled to the data processing module for producing an output signal having a common image output format based upon the user data stream, wherein the common image output format including one of Analog, Camera link, GigE, GigE Vision, USB 2.0, USB 3.0, USB 3.0 Vision, FireWire (IEEE 1394), CoaxPress, Wireless Wi-Fi, and Bluetooth.

The TDI image controller 434 implements a time delay integration (TDI) process for capturing images including an object having a rate of movement relative to the CCD, the TDI process including: time delay integrating the CCD for a first number of cycles; reading a first frame of the images from the CCD; time delay integrating the CCD for a second number of cycles different from the first number of cycles; and reading a second frame of the images from the CCD. The time delay integration for the first number of cycles and the second number of cycles is based upon a determined brightness of the object, and the single exposure area scan image controller implements a single exposure area scan image process for capturing an at least one image independent of rate of motion, the single exposure area scan image process including setting an exposure time of the CCD, wherein the exposure time is based upon a determined brightness of the at least one image.

Figure 5:
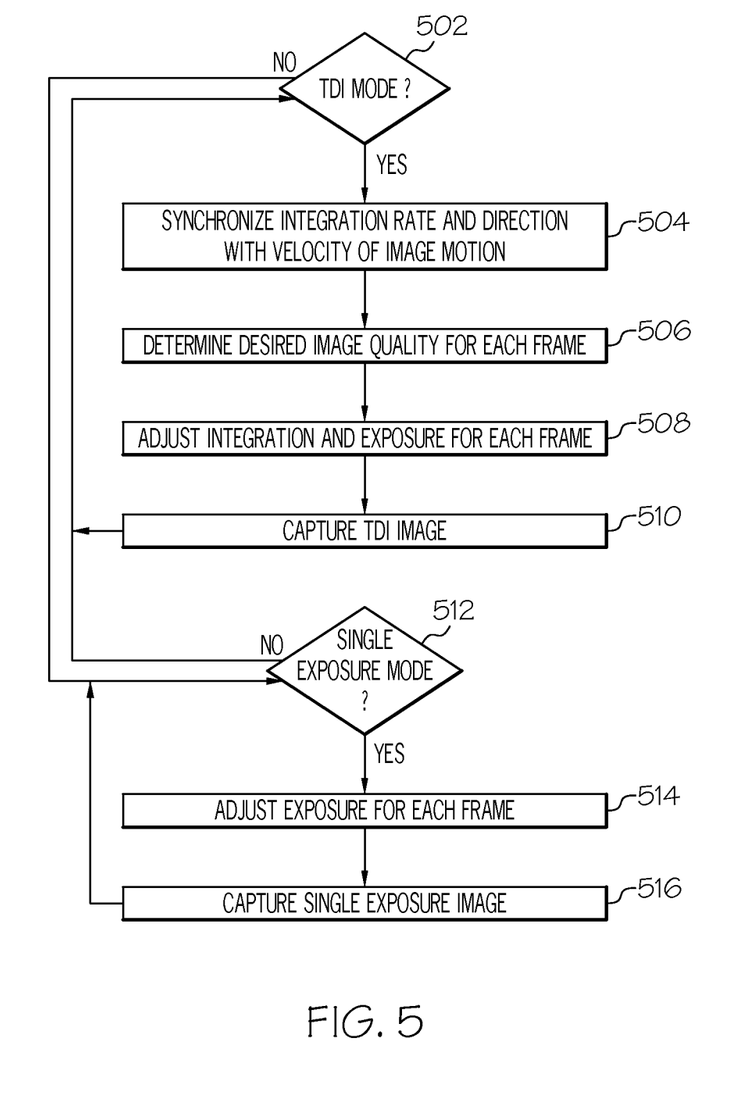
FIG. 5 illustrates an example flow diagram of a method wherein a CCD is selectively coupled to a time delay integration (TDI) controller and selective coupled to a single exposure area scan image controller.

FIG. 5 illustrates an example flow diagram of a method wherein a CCD is selectively coupled to a time delay integration (TDI) controller and selective coupled to a single exposure area scan image controller. The TDI mode captures images based upon a motion relative to the CCD while standard single exposure area scan mode captures images independent of relative rate of movement. If the TDI mode is determined, typically by the user processing module 440 signaling the timing and processing module 430, then at step 502 the CCD is coupled to the TDI controller. Then step 504 synchronizes the integration rate and integration direction with the velocity of motion of the image. The integration rate corresponds to the period of the cycles of the integration wherein charges accumulated in a pixel are shifted into the VSA once each cycle and the direction of movement of the image determines if the VSA is shifted towards the top HCCD or the bottom HCCD. The direction of shifting may be optional in systems where only a single HCCD is present in the CCD. Step 506 determines the desired image quality for each frame and step 508 sets the integration cycles and the exposure time for each cycle. The setting may be performed in user processing module 440 and communicated to timing and processing module 430. The CCD is then driven by these parameters by timing and processing module and a TDI image is then captured from the CCD in step 510.

If the single exposure area scan mode is determined, typically by the user processing module 440 signaling the timing and processing module 430, then at step 512 the CCD is coupled to the single exposure area scan controller. The exposure time for each frame is adjusted at step 514 and a single exposure area scan image is captured at step 516.

In one example, FIG. 5 shows that a plurality of frames may be captured in TDI mode followed by at least one frame captured in the single exposure area scan mode. By analyzing the final two frames of the TDI mode followed by a frame in the single exposure area scan mode, FIG. 5 shows coupling the CCD to the TDI controller for the first frame and the second frame and coupling the CCD to the single exposure area scan image controller for the third frame. FIG. 5 also shows a process where the first frame and the second frame read from the CCD are time delay integrated and the third frame read from the CCD is not time delay integrated. The first, second and third frames may be included in a multiplicity of frames read from the CCD wherein the first and second frames may be included in the multiplicity of frames and may correspond to photographs or video image streams generated using the TDI approach. Furthermore, the third frame may be included in the multiplicity of frames and may correspond to a photograph or one image of a video image stream generated the using single exposure area scan approach.

Figure 6:
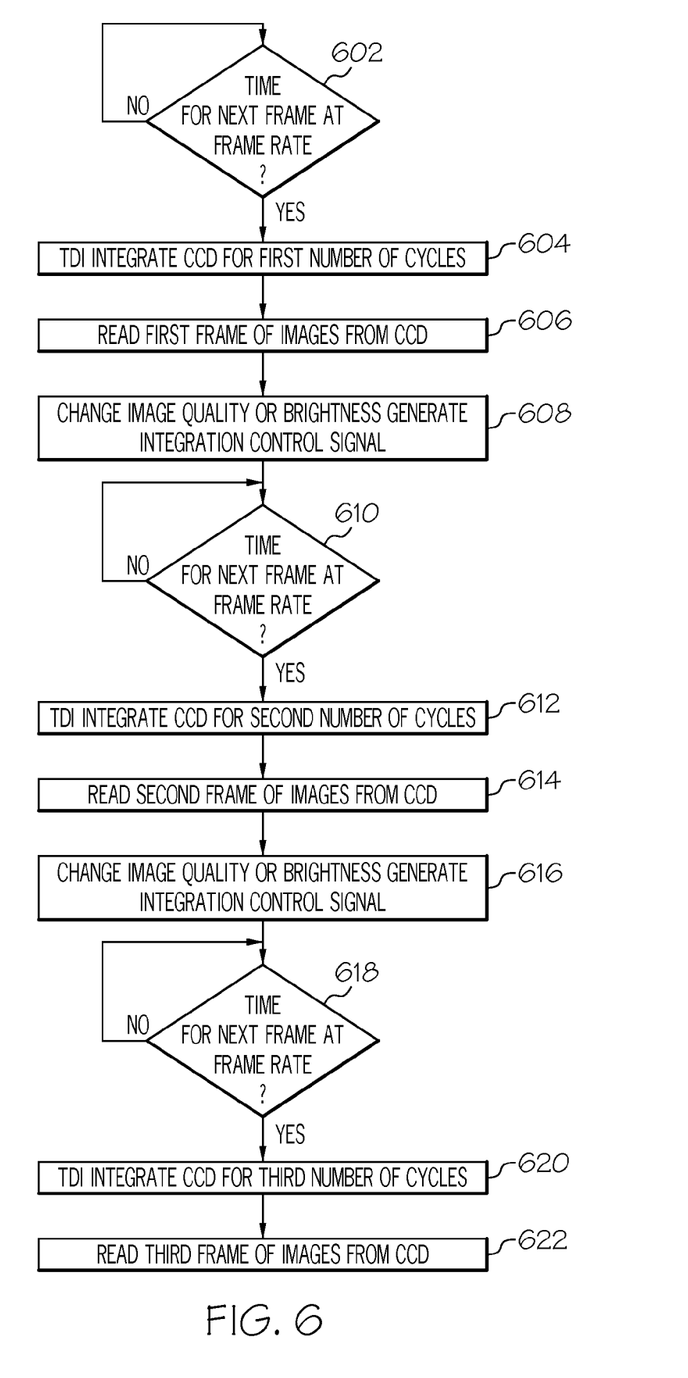
FIG. 6 illustrates an example flow diagram of a method of reading a charge coupled device (CCD) image sensor operating in a multiple exposure time delay integration (TDI) mode.

FIG. 6 illustrates an example flow diagram of a method of reading a charge coupled device (CCD) image sensor operating in a multiple exposure time delay integration (TDI) mode. The TDI mode captures images including an object having a rate of movement relative to the CCD. The flow diagram of FIG. 6 represents several executions of the loop of FIG. 5 corresponding to steps 502-510. Step 602 delays until it is determined that it is time for the next frame based upon the desire frame rate of images read from the CCD. The CCD is TDI integrated for a first number of cycles at step 604, the first number of cycles may be determined by the user processing module 440 and communicated by an integration control signal to the timing and processing module 430 which accordingly drives the CCD 420. Then a first fame is read at step 606. Step 608 determines to change image quality and generate an integration control signal for changing the number of cycles integrated on the next frame. The integration control signal may be based upon a brightness of a moving object included in the image or other image quality factors. Step 610 delays until it is determined that it is time for the next frame based upon the desire frame rate of images read from the CCD. The CCD is TDI integrated for a second number of cycles at step 612 based upon step 606. Then a second fame is read at step 614. Step 616 determines to change image quality and generate an integration control signal for changing the number of cycles integrated on the next frame. The integration control signal may again be based upon a brightness of a moving object included in the image. Step 618 delays until it is determined that it is time for the next frame based upon the frame rate of images read from the CCD. The CCD is TDI integrated for a third number of cycles at step 620 based upon step 616. Then a third fame is read at step 622. FIG. 6 demonstrates that the number of cycles TDI integration may be varied on a frame by frame basis wherein the frames may be generated at a constant frame rate. A constant frame rate may be desirable in various applications including video and video processing applications.

Furthermore, FIG. 6 shows a method comprising time delay integrating the CCD for a first number of cycles at step 604, reading a first frame of images from the CCD at step 606, time delay integrating the CCD for a second number of cycles different from the first number of cycles at step 612; and reading a second frame of images from the CCD at step 614. The first number of cycles and the second number of cycles is based upon the integration control signal. The integration control signal is based upon a determined brightness of the object or other image quality factors. Steps 602, 610 and 618 cooperate to establish a frame rate from which a multiplicity of frames are read from the CCD. The first frame and the second frame are included in the multiplicity of frames and the second frame is read immediately after the first frame at the frame rate.

Step 620 shows time delay integrating the CCD for a third number of cycles, the third number of cycles being different from the first number of cycles and the third number of cycles being different from the second number of cycles. Step 622 shows reading a third frame of images from the CCD. Furthermore, the flowchart of FIG. 6 shows reading a multiplicity of frames from the CCD at a frame rate wherein the first frame, the second frame and the third frame are included in the multiplicity of frames and the second frame is read immediately after the first frame at the frame rate and the third frame is read immediately after the second frame at the frame rate. Note that when the number of cycles in a TDI is preset by a manufacturer the ability for a user process to adjust the number of integration cycles on a frame by frame basis is not available. The inventor has provided the ability to adjust the integration cycles on a frame by frame basis allows the user to develop processes that improve the quality of the images read from the CCD according to their application or need. Note that although the example of FIG. 6 shows the frame being generated at a set frame rate, in other examples, the delays at steps 602, 610 and 618 can be arbitrarily set and the frames generated without a periodicity and not at regular time intervals.

Figure 7:
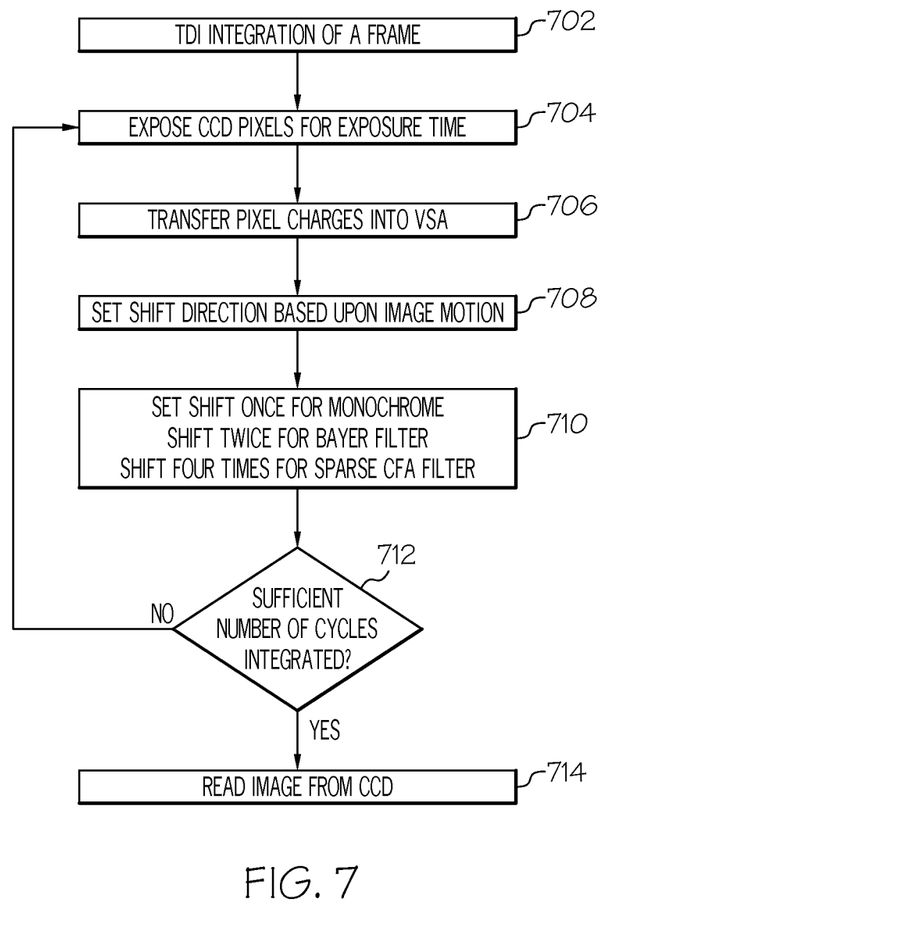
FIG. 7 illustrates an example flow diagram of a TDI integration of a frame.

FIG. 7 illustrates an example flow diagram of a TDI integration of a frame. The processes of FIG. 7 may correspond to the processes of step 510 of FIG. 5, steps 604-606, 612-614, or 620-622 of FIG. 6. The process is entered at step 702 where the frame rate, number of cycles to be integrated and direction of shifting of the VSA may be determined prior to the TDI integration of the frame. Step 704 exposes CCD pixel for an exposure time, the exposure time may be included in a signal from user processing module 440 to timing and processing module 430. After exposure, step 706 transfer pixel charges to the VSA and step 708 sets the shift direction of the VSA based upon the image motion. For example, if a TDI image is desired on an object that switches direction of motion, such as a pendulum or a low earth orbiting satellite collecting images of the earth, and then rotates one hundred and eighty degrees such that the image of the earth passes below in an opposite direction, then the shift direction of the VSA would correspondingly change. The direction of the shifting of the VSA may be in response to a signal from user processing module 440 to timing and processing module 430. Step 710 then shifts the VSA a number of times per integration cycle based upon the CCD. The VSA is shifted once (or one shift) for a monochrome image from a monochrome CCD, twice (or two shifts) for a CCD with a Bayer filter and four times (or four shifts) for a CCD with a SPARSE CFA filter. If a sufficient number of cycles of the time delay integration process have occurred at step 712, based upon a received integration signal, then the image is read from the CCD at step 714. In another example, the decision at step 712 may be based upon signals received from the HCCD, or other information associated with image being captured, on a cycle by cycle basis.

FIG. 7 shows one example where the CCD produces monochrome images and the time delay integrating the CCD includes transferring pixel charges from a pixel to a vertical shield charge storage register (VSA) of the CCD once for each cycle and shifting the vertical shield charge storage register once for each cycle at step 710 because the CCD is a monochrome CCD.

If the CCD has a color filter, FIG. 7 shows shifting the VSA a plurality of time for each cycle. FIG. 7 shows another example where the CCD produces color images and the time delay integrating the CCD includes transferring pixel charges from a pixel to a vertical shield charge storage register (VSA) of the CCD once for each cycle and shifting the vertical shield charge storage register twice for each cycle at step 710 because the CCD is a color CCD with a Bayer filter. FIG. 7 also shows another example where the CCD produces color images and the time delay integrating the CCD includes transferring pixel charges from a pixel to a vertical shield charge storage register (VSA) of the CCD once for each cycle and shifting the vertical shield charge storage register four times for each cycle at step 710 because the CCD is a color CCD with a SPARSE CFA filter.

FIG. 7 also shows an example where the object has a direction of movement including a first direction of movement and a second direction of movement opposite to the first direction of movement and the time delay integrating the CCD for includes transferring pixel charges from a pixel to a vertical shield charge storage register of the CCD once for each cycle at step 706 and shifting the vertical shield charge storage register in a first shift direction for each cycle. Also, the reading of the first frame of images from the CCD includes shifting the vertical shield charge storage register in the first shift direction. The amount of shifting of the vertical shield charge storage register may be by an amount equal to or greater than the number of lines of pixels. If the direction of motion changes on a subsequent frame, the time delay integrating the CCD for the subsequent frame includes transferring pixel charges from the pixel to the vertical shield charge storage register of the CCD once for each cycle at step 706 and shifting the vertical shield charge storage register in a second shift direction opposite the first shift direction. Also, the reading of the second frame of images from the CCD includes shifting the vertical shield charge storage register in the second shift direction. The amount of shifting of the vertical shield charge storage register may be by an amount equal to or greater than the number of lines of pixels.

Accordingly, the present description provides method and apparatus for using the ordinary single exposure area scan interline transfer CCD imaging devices in TDI scanning mode, which allows the user to obtain a high resolution area-scan image with very high sensitivity from any conventional interline transfer CCD imager.

In an example, the description provides a method for using the ordinary monochrome area scan interline transfer CCD imaging devices in TDI scanning mode, the method comprising of the following steps:
 a) exposing the entire CCD array,
 b) transferring the pixel charges to the vertical shielded charge storage
 c) shifting the entire image once into the adjacent rows.
 d) repeating the steps above ("a", "b", "c") as many times as required to achieve the required image quality.
 e) reading out a number of rows equal or greater of the total number of the imager rows.

The exposure may be identical or different for every exposed frame.

In an example, the description provides a method for using an ordinary Bayer (RGBG or YCMG) color pattern area scan interline transfer CCD imaging devices in TDI scanning mode, the method comprising of the following steps:
 a) exposing the entire CCD array,
 b) transferring the pixel charges to the vertical shielded charge storage
 c) shifting the entire image twice into the adjacent rows.
 d) repeating the steps above ("a", "b", "c") as many times as required to achieve the required image quality.
 e) reading out a number of rows equal or greater of the total number of the imager rows.

The color pattern may be a standard or nonstandard color filter array. The exposure may be identical or different for every exposed frame.

In an example, the description provides a method for using the ordinary SPARSE CFA area scan interline transfer CCD imaging devices in TDI scanning mode, the method comprising of the following steps:
 a) exposing the entire CCD array,
 b) transferring the pixel charges to the vertical shielded charge storage
 c) shifting the entire image four times into the adjacent rows.
 d) repeating the steps above ("a", "b", "c") as many times as required to achieve the required image quality.
 e) reading out a number of rows equal or greater of the total number of the imager rows.

The exposure may be identical or different for every exposed frame.

In an example, the description provides a method for using an ordinary area scan interline transfer CCD imaging devices in TDI scanning mode, where said array has at least two sets of horizontal transfer register located on the opposite sides of the CCD, where such registers are at least one on the top and at least one on the bottom, the method comprising of the following steps:
 a) exposing the entire CCD array,
 b) transferring the pixel charges to the vertical shielded charge storage
 c) shifting the entire image four times into the adjacent rows in the preselected direction. Said direction can be changed by the user
 d) repeating the steps above ("a", "b", "c") as many times as required to achieve the required image quality.
 e) reading out a number of rows equal or greater of the total number of the imager rows.

The exposure may be identical or different for every exposed frame. The interline transfer CCD may be monochrome, Bayer (RGBG or YCMG) Color, SPARCE CFA or any other color filter arrangement.

In an example, the description provides a novel camera apparatus for using the ordinary monochrome area scan interline transfer CCD imaging devices in TDI scanning mode, comprising of at least one CCD image sensor to capture the light and to convert it to an electrical signal, at least one sensor timing module, capable of generating CCD timing to produce a standard areas scan mode and a TDI scan mode, and to interface and control said image sensor, to process said electrical signal and to format it as a video data, a power supply module to provide the required voltages for the proper operation, a camera power and output module to convert the processed video data stream to a recognizable video format, at least one output interface connector to provide the required video, power and the required user I/O interface and programming. The recognizable video format may be an Analog, Gigabit Ethernet (GigE), Gigabit Vision Ethernet (GEV), CameraLink, CoaxPress, USB, USB Vision, FireWire (IEEE 1394), Wi-Fi wireless, or Bluetooth, or any nonstandard wired or wireless, digital or analog connection. The first processor and the second processor can be similar or different CPLDs or FPGAs from Altera, Xilinx, Lattice, or any CPLD or FPGA vendor.

The principles of the description have been described with reference to the described examples. Modifications and variations could occur to those upon reading and understanding the preceding detailed description. It is intended that the scope of the claims be construed as including all such modifications and alterations insofar as they come within the scope of the appended claims or equivalents thereof.

The description of the present application has been presented for purposes of illustration and description, but is not intended to be exhaustive or limited to the description in the form disclosed. Many modifications and variations will be apparent without departing from the scope of the description. The examples were chosen and described in order to best explain the principles of the description and the practical application, and to enable the understanding of the description for various examples with various modifications as are suited to the particular use.

What is claimed is:

1. A method of reading a charge coupled device (CCD) image sensor operating in a multiple exposure time delay integration (TDI) mode for capturing images including an object having a rate of movement relative to the CCD, the method comprising:
    time delay integrating the CCD for a first number of cycles;
    reading a first frame of images from the CCD;
    time delay integrating the CCD for a second number of cycles different from the first number of cycles;
    reading a second frame of images from the CCD, wherein the CCD includes a number of lines of pixels and the time delay integrating the CCD for the first number of cycles includes:
        transferring pixel charges from a pixel to a vertical shield charge storage register of the CCD once for each cycle of the first number of cycles; and
        shifting the vertical shield charge storage register for an at least one shift each cycle of the first number of cycles, and
    the reading the first frame of images from the CCD includes shifting the vertical shield charge storage register by an amount equal to or greater than the number of lines of pixels.

2. The method according to claim 1 further comprising receiving an integration control signal wherein the first number of cycles and a second number of cycles is based upon the integration control signal.

3. The method according to claim 2 wherein the integration control signal is based upon a determined brightness of the object.

4. The method according to claim 1 further comprising reading a multiplicity of frames from the CCD at a frame rate wherein the first frame and the second frame are included in the multiplicity of frames and the second frame is read immediately after the first frame at the frame rate.

5. The method according to claim 4 further comprising:
    time delay integrating the CCD for a third number of cycles, the third number of cycles being different from the first number of cycles and the third number of cycles being different from the second number of cycles; and
    reading a third frame of images from the CCD.

6. The method according to claim 5 further comprising reading a multiplicity of frames from the CCD at a frame rate wherein the first frame, the second frame and the third frame are included in the multiplicity of frames and the second frame is read immediately after the first frame at the frame rate and the third frame is read immediately after the second frame at the frame rate.

7. The method according to claim 1 wherein CCD produces monochrome images and the at least one shift corresponds to one shift.

8. The method according to claim 1 wherein CCD produces color images and includes a Bayer filter and the at least one shift corresponds to two shifts.

9. The method according to claim 1 wherein CCD produces color images and includes a SPARSE CFA filter and the at least one shift corresponds to four shifts.

10. The method according to claim 1 wherein the CCD includes a number of lines of pixels, the object has a direction of movement including a first direction of movement and a second direction of movement opposite to the first direction of movement and the time delay integrating-and wherein the reading the first frame of images from the CCD includes shifting the vertical shield charge storage register in a first shift direction by an amount equal to or greater than the number of lines of pixels,
    the time delay integrating the CCD for a second number of cycles includes:
    transferring pixel charges from the pixel to the vertical shield charge storage register of the CCD once for each cycle of the second number of cycles; and
    shifting the vertical shield charge storage register in a second shift direction opposite the first shift direction for each cycle of the second number of cycles, and
    the reading the second frame of images from the CCD includes shifting the vertical shield charge storage register in the second shift direction by an amount equal to or greater than the number of lines of pixels.

11. The method according to claim 1 further comprising reading a third frame from the CCD, wherein the third frame is not time delay integrated.

12. The method according to claim 11 wherein the CCD is selectively coupled to a time delay integration (TDI) controller and selective coupled to a single exposure area scan image controller for capturing images independent of relative rate of movement, and the method further comprises:
    reading a multiplicity of frames from the CCD at a frame rate wherein the first frame, the second frame and the third frame are included in the multiplicity of frames;
    coupling the CCD to the TDI controller for at least the first frame and the second frame of the multiplicity of frames; and
    coupling the CCD to the single exposure area scan image controller for at least the third frame of the multiplicity of frames.

13. An image capturing device comprising:
    a charge coupled device (CCD) for capturing images;
    a time delay integration (TDI) image controller selectively coupled to the CCD for producing a TDI data stream including TDI images from the CCD for a number of cycles, the TDI image controller configure for each cycle to:
    expose an image onto the CCD,
    transfer pixel charges from a pixel to a vertical shield charge storage register, shift the vertical shield charge storage register for an at least one shift, and
read a first frame of images from the CCD;
a single exposure area scan image controller selectively coupled to the CCD for producing a single exposure area scan data stream including single exposure area scan images from the CCD; and
a controller for selectively coupling the TDI image controller and the single exposure area scan image controller to the CCD;
a timing and processing module including the TDI image controller and the single exposure area scan image controller, the timing and processing module coupled to the CCD, the timing and processing module producing the TDI data stream and the single exposure area scan data stream;
a data processing module coupled to the timing and processing module, the data processing module having a user process configured to process the TDI data stream and the single exposure area scan data stream and generate a user data stream; and
a camera output module coupled to the data processing module for producing an output signal having a common image output format based upon the user data stream, wherein the common image output format includes one of Analog, Camera link, GigE, GigE Vision, USB 2.0, USB 3.0, USB 3.0 Vision, FireWire (IEEE 1394), CoaxPress, Wireless Wi-Fi, and Bluetooth.

14. An image capturing device comprising:
a charge coupled device (CCD) for capturing images;
a time delay integration (TDI) image controller selectively coupled to the CCD for producing a TDI data stream including TDI images from the CCD for a number of cycles, the TDI image controller configure for each cycle to:
expose an image onto the CCD,
Transfer pixel charges from a pixel to a vertical shield charge storage register,
shift the vertical shield charge storage register for an at least one shift, and
read a first frame of images from the CCD;
a single exposure area scan image controller selectively coupled to the CCD for producing a single exposure area scan data stream including single exposure area scan images from the CCD; and
a controller for selectively coupling the TDI image controller and the single exposure area scan image controller to the CCD;
wherein the TDI image controller implements a time delay integration (TDI) process for capturing images including an object having a rate of movement relative to the CCD, the TDI process including:
time delay integrating the CCD for a first number of cycles;
reading a first frame of the images from the CCD;
time delay integrating the CCD for a second number of cycles different from the first number of cycles; and
reading a second frame of the images from the CCD, wherein the time delay integration for the first number of cycles and the second number of cycles is based upon a determined brightness of the object, and the single exposure area scan image controller implements a single exposure area scan image process for capturing an at least one image independent of rate of motion, the single exposure area scan image process including
setting an exposure time of the CCD, wherein the exposure time is based upon a determined brightness of the at least one image.

15. An image capturing device for reading a charge coupled device (CCD) image sensor operating in a multiple exposure time delay integration (TDI) mode for capturing images including an object having a rate of movement relative to the CCD, the image capturing device comprising:
a charge coupled device (CCD) for capturing images;
a time delay integration (TDI) image controller selectively coupled to the CCD for time delay integrating the CCD for a first number of cycles;
reading a first frame of images from the CCD;
time delay integrating the CCD for a second number of cycles different from the first number of cycles;
reading a second frame of images from the CCD,
wherein the CCD includes a number of lines of pixels and the time delay integrating the CCD for the first number of cycles includes:
transferring pixel charges from a pixel to a vertical shield charge storage register of the CCD once for each cycle of the first number of cycles; and
shifting the vertical shield charge storage register for an at least one shift each cycle of the first number of cycles, and
the reading the first frame of images from the CCD includes shifting the vertical shield charge storage register by an amount equal to or greater than the number of lines of pixels.

16. The image capturing device according claim 15 further comprises a camera output module coupled to the CCD for producing a common image output format based upon the TDI data stream and the single exposure area scan data stream.

17. The image capturing device according to claim 16 wherein the common image output format includes one of Analog, Camera link, GigE, GigE Vision, USB 2.0, USB 3.0, USB 3.0 Vision, FireWire (IEEE 1394), CoaxPress, Wireless Wi-Fi, and Bluetooth.

18. A non-transitory computer program product for processing images, the computer program product comprising a computer readable storage medium having program instructions embodied therewith, the program instructions executable by a computer system having charge coupled device (CCD) image sensor operating in a multiple exposure time delay integration (TDI) mode for capturing images including an object having a rate of movement relative to the CCD, the program instructions causing the computer system to perform a method comprising:
time delay integrating the CCD for a first number of cycles;
reading a first frame of images from the CCD;
time delay integrating the CCD for a second number of cycles different from the first number of cycles;
reading a second frame of images from the CCD,
wherein the CCD includes a number of lines of pixels and the time delay integrating the CCD for the first number of cycles includes:
transferring pixel charges from a pixel to a vertical shield charge storage register of the CCD once for each cycle of the first number of cycles; and
shifting the vertical shield charge storage register for an at least one shift each cycle of the first number of cycles, and
the reading the first frame of images from the CCD includes shifting the vertical shield charge storage register by an amount equal to or greater than the number of lines of pixels.

19. The non-transitory computer programming product according to claim 18 wherein the computer system further comprises a single exposure area scan image process the method further comprising:
  operating the CCD with the single exposure area scan image process having an exposure time for a third frame; and
  reading the third frame from the CCD, wherein the exposure time is based upon a determined brightness of the image of the third frame.

* * * * *